(No Model.)  6 Sheets—Sheet 1.
F. H. SMITH.
PAPER FOLDING MACHINE.
No. 331,832.  Patented Dec. 8, 1885.
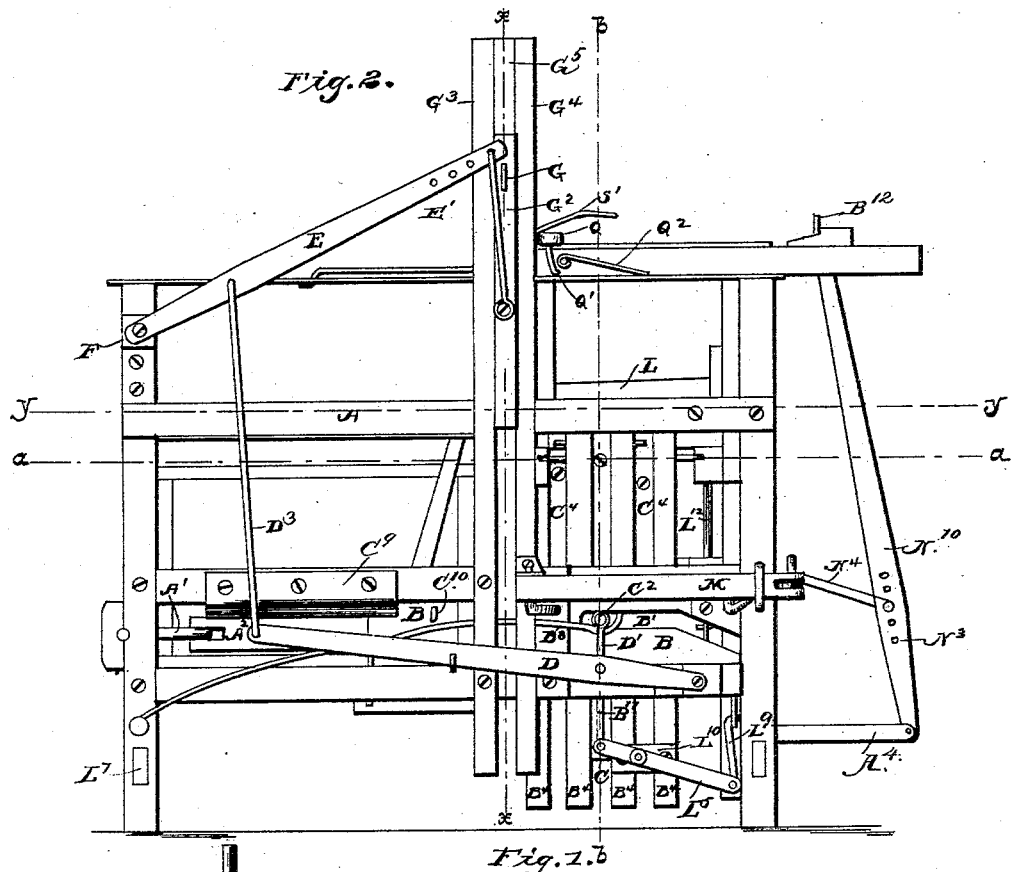
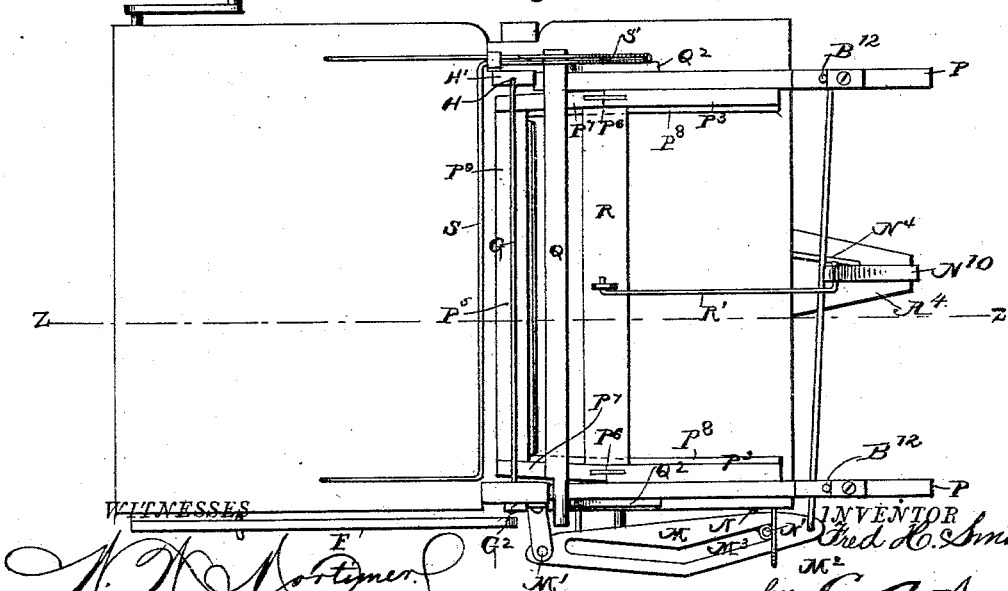
WITNESSES  INVENTOR
Fred H. Smith
by C. A. Snow & Co.
Attorneys
N. PETERS, Photo-Lithographer, Washington, D. C.

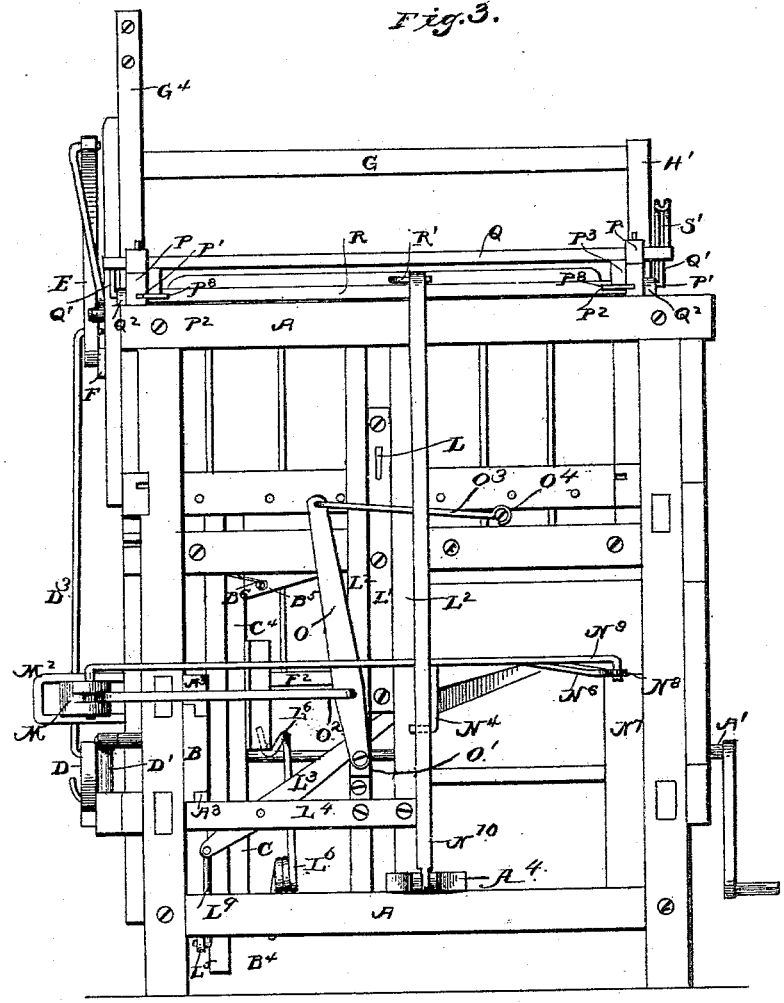

(No Model.)　　　　　F. H. SMITH.　　　6 Sheets—Sheet 3.
PAPER FOLDING MACHINE.

No. 331,832.　　　　　Patented Dec. 8, 1885.

(No Model.) 6 Sheets—Sheet 4.

F. H. SMITH.
PAPER FOLDING MACHINE.

No. 331,832. Patented Dec. 8, 1885.

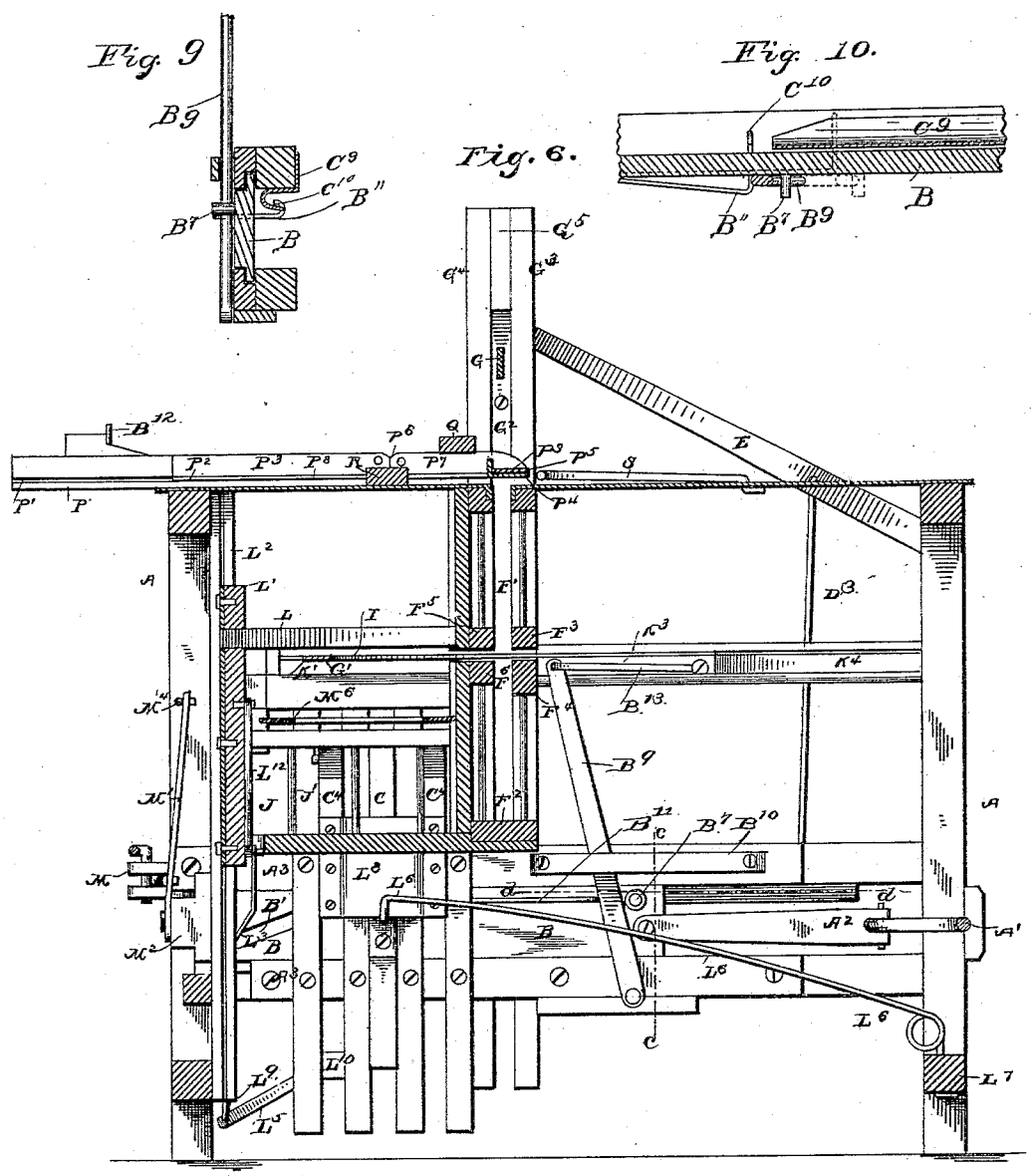

UNITED STATES PATENT OFFICE.

FRED H. SMITH, OF BLUE EARTH CITY, MINNESOTA.

PAPER-FOLDING MACHINE.

SPECIFICATION forming part of Letters Patent No. 331,832, dated December 8, 1885.

Application filed October 10, 1884. Serial No. 145,196. (No model.)

*To all whom it may concern:*

Be it known that I, FRED H. SMITH, a citizen of the United States, residing at Blue Earth City, in the county of Faribault and State of Minnesota, have invented a new and useful Improvement in Paper-Folding Machines, of which the following is a specification, reference being had to the accompanying drawings.

This invention has relation to paper-folding machines; and it consists in the construction and novel arrangement of parts, as will be hereinafter fully described, and particularly pointed out in the claims.

Figure 4:
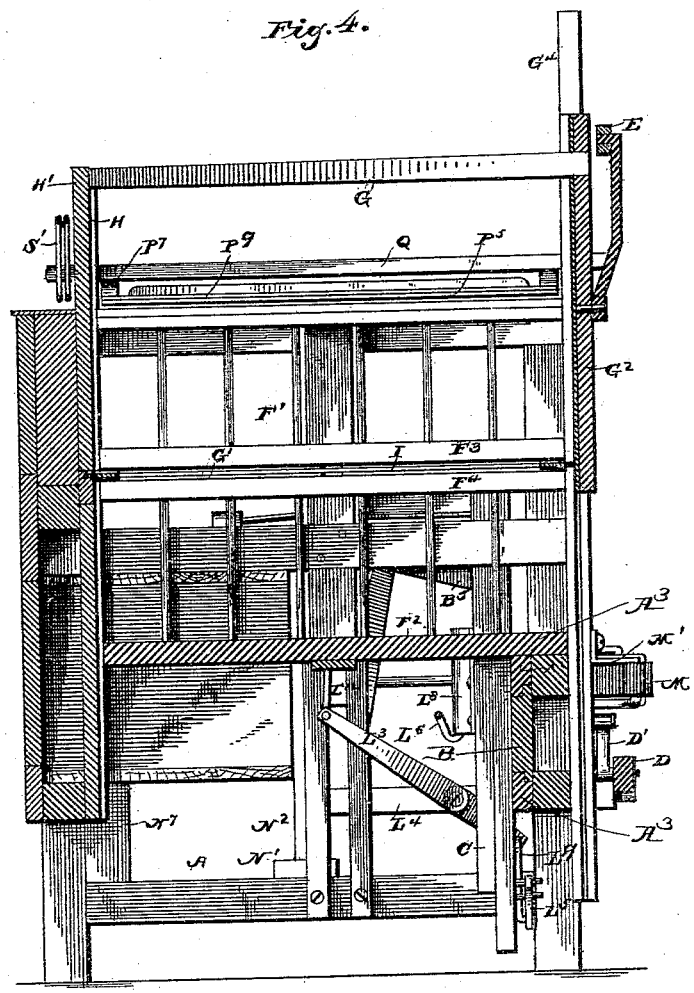
Figure 5:
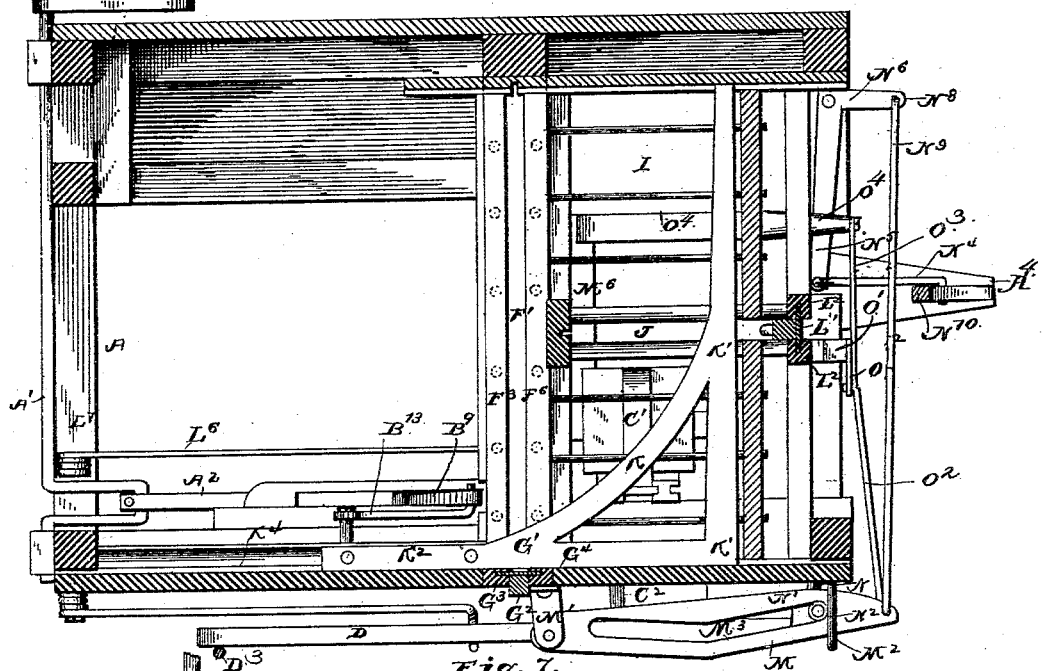
Figure 7:
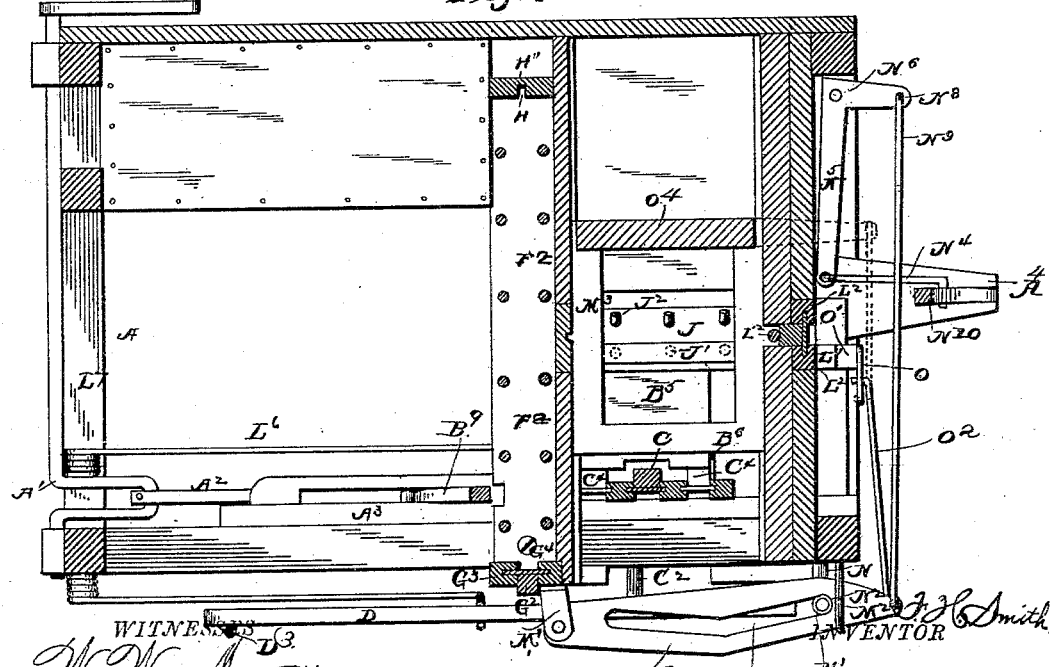
Figure 8:
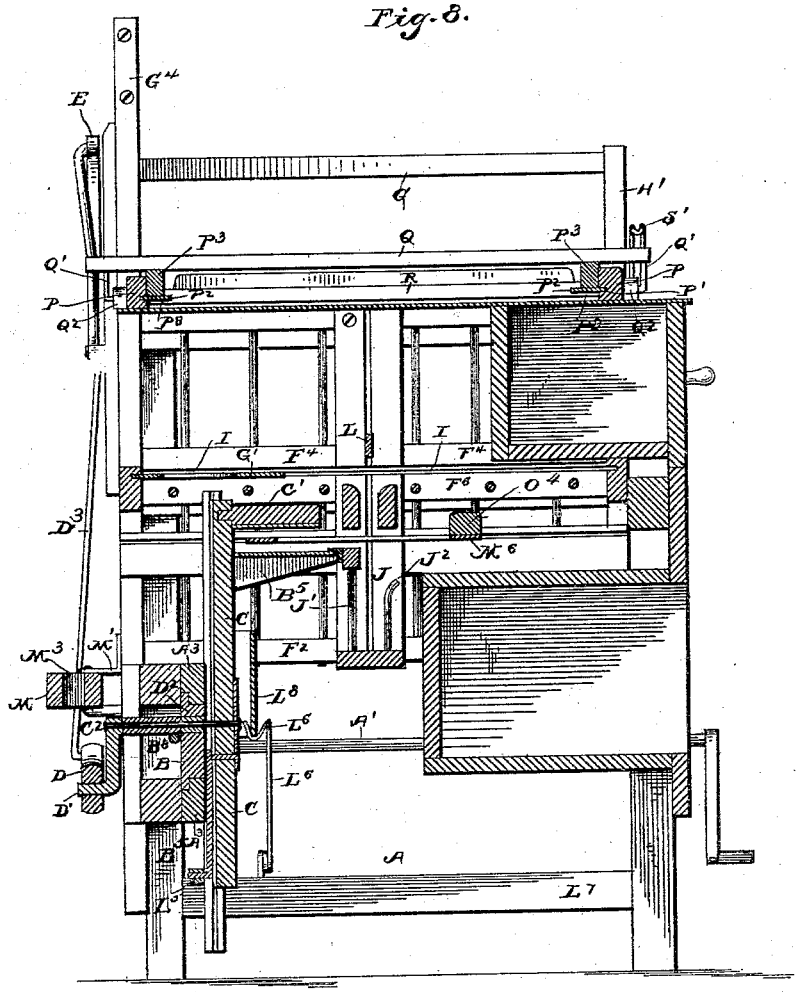

In the drawings, Figure 1 is a plan view of a paper-folding machine embodying my improvements. Fig. 2 is a side elevation. Fig. 3 is an end elevation. Fig. 4 is a vertical transverse sectional view taken on the line $x$ $x$ in Fig. 2. Fig. 5 is a horizontal longitudinal section on the line $y$ $y$ in Fig. 2. Fig. 6 is a vertical section on the line $z$ $z$ in Fig. 1. Fig. 7 is a horizontal sectional view on the line $a$ $a$ in Fig. 2, and Fig. 8 is a transverse vertical sectional view on the line $b$ $b$ in Fig. 2. Fig. 9 is a detail vertical sectional view taken on the line $c$ $c$ of Fig. 6. Fig. 10 is a detail horizontal sectional view taken on the line $d$ $d$ of Fig. 6.

Referring by letter to the accompanying drawings, A designates the frame-work of the machine, at one end of which and supported in suitable bearings is the double-crank shaft A'.

To the crank-shaft A' is connected the pitman-rod $A^2$. The other end of said pitman-rod $A^2$ is connected to the rear end of a slide, B, working in horizontal ways $A^3$ at one side of the frame A of the machine. In its forward part the slide B is provided with a slot, B', the front portion of which is inclined downwardly, the rear portion of said slot B' being horizontal.

To the inner faces of the horizontal ways $A^3$ $A^3$ of the frame are secured four vertical strips, $B^4$. The two intermediate strips $B^4$ $B^4$ form a guide for the packer-stem C of the packer C', and the two outer strips $B^4$, in connection with the intermediate strips $B^4$, form ways for the guides $C^4$ of the packer-table $B^5$. The packer-table $B^5$ is provided with a detent, $B^6$, which prevents the packer-table from being carried up by the spring $L^6$ when the detent is in engagement with the face of one of the strips $B^4$. The packer-stem C is provided with a lateral arm, $C^2$, which projects through the slot B' in the slide B, and is connected with the lever D by a crank-arm D'. The crank-arm D' is provided with a friction-roller, $D^2$, which works in the slot B' and lessens the friction in said slot B'. A spring, $B^8$, is secured to the lower side rail of the frame, and connects at its rear end with the crank-arm D' and bears up against said crank-arm D', and assists in raising the packer after it has pressed the folded paper.

From the rear end of the lever D a pitman-rod, $D^3$, extends upwardly and connects with a lever, E, fulcrumed to the rear end of the frame at F. The lever E is provided with a series of perforations, E', so that the pitman-rod can be adjusted from one to another of said holes, to lengthen or shorten the stroke of the lever D, and thereby adapt the machine to fold papers of different sizes.

Near the middle of the machine I provide the first pocket, F', which traverses the machine both vertically and transversely, and extends from the top or feed table down to the transverse rail $F^2$, which forms the bottom of said pocket. This pocket F' is divided horizontally at its middle by the transverse rails $F^3$ $F^4$ $F^5$ $F^6$, which have spaces between them for the passage of the vertically-working knife G and the horizontally-working knife G'. The knife G, which is the first knife, is secured at one end in a slide, $G^2$, which works in vertical guides $G^3$ $G^4$, near the middle of the frame and at one side thereof. The guides $G^3$ $G^4$ are grooved in their opposing faces, and the slide $G^2$ is provided with tongues which fit the grooves. At the upper ends of the guides a stop-block, $G^5$, closes the groove or way in which the slide $G^2$ works. The opposite end of the knife is without a slide and works in a groove, H, in the upright H'. The second pocket, I, is a horizontal pocket, and is located at the middle of the first pocket, F', and extends rearward therefrom. The sides of the first pocket, F', are formed of vertical wire rods arranged in the rails of the pockets at suitable intervals. The second pocket, I, has but one side, that being the lower side, and said side is formed of wire rods also. The third pocket, J, is a vertical pocket, is located at the middle of the second pocket, I, and below the same. This pocket J has two sides formed of wire rods, the rods J', next the packer-table, being fixed at both ends, while the rods $J^2$, that form the opposite side of the pocket J, are bent away from the pocket at their upper ends. The second knife, K, is a horizontal knife. Its blade K' extends entirely across the frame of the folder, and its arm $K^2$ is secured to a slide, $K^3$, in a horizontal way, $K^4$, extending from the rear of the frame to the first pocket, F'. The third knife, L, is a vertical knife, and works in the third pocket, J, and forms the third fold in the paper. The third knife, L, is secured at one end to a vertical slide, L', working in vertical ways $L^2$ at the rear end of the machine. At its middle the slide L' is connected by a pitman, $L^{12}$, to one end of a lever, $L^3$, fulcrumed to a cross-arm, $L^4$, at the rear end of the frame. The other end of the lever $L^3$ is connected, by a link, $L^9$, to the rear end of a lever, $L^5$, fulcrumed to a plate, $L^{10}$, secured to the outer faces of the two strips $B^4$ $B^4$ nearest the rear end of the frame of the machine. The other end of the lever $L^5$ is connected to the lower end of a rod, $B^{11}$, pivoted to the packer-stem C, and transmits the motion of the packer C to the knife L. A spring, $L^6$, connected to the lower rear cross-rail, $L^7$, of the frame of the machine, extends forward under the guard $L^8$, secured to the slides of the packer-table $B^5$, and supports the packer-table, and at the same time permits it to descend as each paper is placed upon it, so that one paper can be placed folded upon another by the last folding-knife of the series, and the operation may be continued until the table has been filled, when the papers should be removed, and the packing-table returned to its normal position by releasing the detent, when the spring will return the packing-table to its normal position.

At one side of the frame A, near the rear end and opposite the middle of the strips $B^4$, is fulcrumed a lever, M, in a lateral bearing, M'. This lever M extends rearwardly and projects through a guard, $M^2$, projecting from the rear post of the frame on that side of the frame on which the lever M is fulcrumed. This lever M has an elongated angular slot, $M^3$, made through it, and said slot $M^3$ curves between its ends. An arm, N, projects laterally from near the rear end of the slide B, and is provided with a vertical arm, N', at its outer end, which arm N' is provided with a friction-roller, $N^2$, on its upper end, which works in said curved slot $M^3$ and vibrates the free end of said arm.

To the rear end of the frame A, at the middle of its lower cross-beam, is secured a rearwardly-extending arm, $A^4$, which forms the fulcrum for the lower end of a vertical lever, $N^{10}$. This lever $N^{10}$ is provided with a series of holes, $N^3$, a short distance above its fulcral point, and is connected through one hole of a series by a rod, $N^4$, with the longer arm $N^5$ of an angle-lever, $N^6$, fulcrumed upon the top of a short post, $N^7$, at one side of the frame A. The shorter arm $N^8$ of the angle-lever $N^6$ is connected by a rod, $N^9$, with the rear end of the slotted lever M. The rear end of the slotted lever M is also connected with a lever, O, the lower end of which is fulcrumed to a bearing, O', projecting from one of the vertical ways, $L^2$, by a rod, $O^2$. The upper end of the lever O is connected by a rod, $O^3$, to the rear end of the handle $O^4$ of the fourth folding-knife, $M^6$, which works transversely of the frame directly beneath the third pocket, J. The folding-knife $M^6$ makes the last fold in the paper and deposits the paper on the packer-table. The last or fourth folding-knife, $M^6$, has its blade made rectangular in form and extended forward from its handle $O^4$. The sides or parallel arms of the fourth knife, $M^6$, work in grooves in the sides of its pocket.

Upon the top of the machine, and in rear of the first pocket, are the grooved parallel ways P, which project beyond the rear end of the machine. The grooves P' are made in the inner faces of the ways P, and receive tongues $P^2$, projecting from the parallel arms $P^3$ of the sliding feed clamp. The lower blade, $P^4$, of the feed-clamp $P^5$ has a vertical stop along its rear side, and its parallel arms $P^8$ extend back to the rear ends of the ways P and project laterally to form the tongues $P^2$. The wooden portions of the parallel arms $P^3$ are provided with hinges $P^6$. The shorter arms, $P^7$, carry the upper flat blade $P^9$ of the feed-clamp $P^5$, and are connected by a transverse bar, Q, the ends of which project beyond the grooved parallel ways P, and are provided with depending bracket-arms Q', having their ends turned horizontally inward to cause them to engage the pivoted inclined arms $Q^2$, pivoted to the outer faces of the parallel ways P. The parallel arms $P^8$ are connected by a transverse bar, R, the ends of which are kerfed horizontally to receive the parallel arms $P^8$ of the lower blade of the feed-clamp. The transverse bar R is connected to the upper end of the lever $N^2$ by a rod, R', and when the machine is operated the lever $N^2$ reciprocates the feed-clamp and causes the unfolded paper to be presented to the first vertical pocket, F'. The feed-clamp moves forward, the depending brackets Q' travel up the pivoted inclined arms $Q^2$ and open the jaws of the feed-clamp by raising the upper jaw of said feed-clamp. Upon the opposite side of the first pocket and pivoted in the top plate of the folder is a wire lifter, S, having an upwardly-curved arm, S'. The projecting end of the transverse bar Q strikes the curved arm S' of the lifter S, and this arm S' raises the paper so that its edge is properly presented to the jaws of the feed-clamp. The edge of the sheet of paper to be folded enters between the jaws of the feed-clamp, and the brackets Q' drop from the inclined arms Q² and pass back beneath them. When the middle of the paper has reached the mouth of the first pocket, the first knife, G, descends and carries the paper down into the first pocket, F', drawing the edge of the sheet of paper that is clamped between the jaws of the feed-clamp from between said jaws and forms the first fold, making a sheet of four pages. The first knife, G, then travels back to its normal place, and nearly at the same time the second knife, K, moves forward, carrying the paper into the second pocket, I, which is a horizontal pocket, and makes the second fold on a line parallel with the first fold. As soon as the second fold has been made in one paper, the first fold is made in another paper in the manner just described. When the knife K or second knife recedes from the second pocket, I, the third knife, L, which is secured only at one end and works vertically and at right angles to the first and second knives, descends upon the middle of the folded paper in the second pocket, I, and carries it down into the third pocket, J, making a fold at the middle of the folded paper and at right angles to the first two folds. As soon as the third knife recedes from its pocket J, the fourth knife, M⁶, which is a horizontal knife and travels horizontally and at right angles to the second knife, K, moves across in its guides, strikes the folded paper in the third pocket, J, carries it out of the third pocket, J, makes the fourth fold in carrying the paper out, deposits the folded paper on the packer-table and then recedes and leaves the paper upon the packer-table. Just as the fourth knife, M⁶, receding, passes the third pocket, J, the next paper has been folded as far as the second pocket, I, and the third knife, L, immediately descends and folds the next paper in the third pocket, J, from which it is taken to the packer-table and deposited on the first paper, and thus on until the packer-table is filled, when the folded papers are removed, and the operation is continued in the manner above described. A sheet of paper thus folded comprises thirty-two pages or sixteen leaves. The sheets are fed to the folder by the flier of the printing-press.

The slide B is provided on its inner face, near its forward end, with a friction-roller, B⁷, which drives the lever B⁹, which is fulcrumed at the lower end below the lower way A³, and works in a guard, B¹⁰, attached to the upper way A³. The upper end of the lever B⁹ is connected by a link, B¹³, to the rear end of the slide of the second knife, K. A spring, B¹¹, let into a horizontal recess in the inner face of the slide B, bears against the lever B⁹ and slips out in front of the lever B⁹ on the forward movement of the slide B, and stops the second knife, K, and permits the first knife to make its downward stroke. A guide, C⁹, is secured to the outer face of the upper timber of the way A³, and a hook, C¹⁰, on the end spring, B¹¹, projects beyond the outer face of the slide B and engages the outer edge of the guide C⁹. The guide C⁹ is beveled at the end nearest the middle of the machine toward the outer face of the slide B. When the slide B moves forward, the spring B¹¹ and hook C¹⁰ move with it. When the hook C¹⁰ reaches the beveled end of the guide C⁹, the hook C¹⁰ slips off the end of the guide C⁹ and presents a shoulder to the lever B⁹. When the slide B moves backward, the hook C¹⁰ of the spring B¹¹ travels up the bevel of the guide C⁹ and draws the shoulder of the spring B¹¹ out of contact with the lever B⁹, and the second knife, K, stops in the mouth of the second pocket, where it remains until again driven forward, as before described. At this time the feed-clamp has been moved back against the stops B¹², and the first fold has been made in the paper.

Having thus fully described my invention, what I claim as new, and desire to secure by Letters Patent of the United States, is—

1. The combination, in a paper-folding machine, of the lifter S, the reciprocating feed-clamp having the pivoted jaw, and means, substantially as described, for opening and closing the jaw for grasping one edge of the paper to be fed, substantially as described.

2. The combination, with the frame provided with the feed-table having the vertical middle pocket, F', of the lifter S, having the curved arm S', the grooved parallel ways P, the feed-clamp P⁵ with pivoted upper jaw, the pivoted inclined arms Q², and mechanism, substantially as described, for operating the feed-clamp, substantially as specified.

3. The combination, with the frame provided with the transverse vertical middle pocket, F', the horizontal intersecting pocket I, and the vertical pocket J, of the slide B, the friction roller or stud B⁷ on its inner face, the spring B¹¹, the lever B⁹, guide C⁹, link B¹³, and second knife, K, substantially as specified.

4. The combination, with the frame A, provided with the vertical strips or guideways B⁴, of the packer having stem C, the packer-table B⁵, the detent B⁶, and mechanism, substantially as described, for operating the packer-table, as specified.

5. The combination, in a paper-folding machine, of the vertically-moving knife G, the horizontally-moving knife K, the vertically-moving knife L, and the horizontally-moving knife M⁶, with the lever D connected to knife G for operating the latter, slide B, having stud or roller B⁷, and spring B¹¹, lever B⁹, operated by slide B and connected to knife K, guide C⁹, for operating spring B¹¹ to release lever B⁹, lever M, lever O, connected to lever M, the knife M⁶ being connected to lever O, substantially as described.

6. The combination, with the frame A, provided with the transverse vertical middle pocket, F', the horizontal intersecting pocket I, the vertical pocket J, the packer, the packer-stem having the lateral arm C², the lever D, the pitman-rod D³, and lever E, connected with the slide of the first knife, G, of the first knife, G, secured in the slide G² in guides G³ G⁴, and grooved upright H', the second knife, K, horizontal way K⁴, lever B⁹, slide B, having friction-roller B⁷, spring B¹¹, guide C⁹, and link B¹³, the third knife, L, secured to the vertical slide L', working in vertical ways, the lever N¹⁰, connected to the angle-lever N⁶, the rod N⁹, connecting lever N⁶ with lever M, the rod O², connecting the levers M and O, and the rod O³, connecting the lever O to the handle O⁴ of the fourth folding knife, M⁶, substantially as specified.

7. The combination, with the frame A, provided with the beveled guide C⁹, of the slide B, provided with the spring B¹¹, and the friction roller or stud B⁷, and the lever B⁹, connected to knife K, substantially as specified.

8. The combination, with the frame A, provided with the vertical strips B⁴, the packer-table, its slides and supporting-spring, of the packer having its stem provided with a lateral arm, and the slide B, provided with slot B', substantially as specified.

9. The combination, with the frame provided with the transverse vertical middle pocket, F', the horizontal pocket I, intersecting pocket F', the vertical pocket J, the packer and packer-table, and the knives G, K, L, and M⁶, of the slotted slide B B', the feed-clamp, and the levers and connecting-rods, substantially as described, connecting the knives, packer, and feed-clamp with the slotted slide B B', substantially as specified.

10. The combination, with the frame A, provided with the feed-table, the vertical middle pocket, F', vertical knife G, horizontal pocket I, horizontal knife K, vertical pocket J, and vertical knife L, of the horizontal knife M⁶, and the packer and packer-table in vertical slides, and mechanism, substantially as described, for operating the knives, packer, and packer-table, as set forth.

In testimony that I claim the foregoing as my own I have hereto affixed my signature in presence of two witnesses.

FRED H. SMITH.

Witnesses:
CHARLES H. FREER,
EDWARD MOONEY.